United States Patent
Calavrezo et al.

(10) Patent No.: US 9,614,765 B2
(45) Date of Patent: Apr. 4, 2017

(54) QUANTIZED CONGESTION NOTIFICATION (QCN) PROXY FUNCTION IN DATA CENTER BRIDGING CAPABILITIES EXCHANGE (DCBX) PROTOCOL

(71) Applicant: Lenovo Enterprise Solutions (Singapore) Pte. Ltd., Singapore (SG)

(72) Inventors: Dan-Alexandru Calavrezo, Bucharest (RO); Ion A. Iavorschi, Bucharest (RO); Keshav G. Kamble, Femont, CA (US); Virgiliu Pop, Bucharest (RO)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 193 days.

(21) Appl. No.: 14/469,325

(22) Filed: Aug. 26, 2014

(65) Prior Publication Data
US 2016/0065426 A1    Mar. 3, 2016

(51) Int. Cl.
*H04L 12/801* (2013.01)
*H04L 12/855* (2013.01)
*H04L 12/851* (2013.01)

(52) U.S. Cl.
CPC .............. *H04L 47/11* (2013.01); *H04L 47/12* (2013.01); *H04L 47/24* (2013.01); *H04L 47/2466* (2013.01)

(58) Field of Classification Search
CPC ......... H04L 47/12; H04L 47/14; H04L 47/10; H04W 28/0289; H04W 28/08
(Continued)

(56) References Cited

U.S. PATENT DOCUMENTS 7,984,043 B1    7/2011  Waas
9,172,655 B1 *  10/2015 Dropps ............... H04L 47/6215
(Continued)

FOREIGN PATENT DOCUMENTS

GB     2497846          6/2013
KR     1020090101384    9/2009
WO     WO2012004600     1/2012

OTHER PUBLICATIONS

IEEE P802.1Qau/D2.4; Oct. 28, 2009 Draft Standard for Local and Metropolitan Area Networks—Virtual Bridged Local Area Networks—Amendment: Congestion Notification.*
(Continued)

*Primary Examiner* — Joshua Kading
*Assistant Examiner* — Atique Ahmed
(74) *Attorney, Agent, or Firm* — Zilka-Kotab, P.C.

(57) ABSTRACT

In one embodiment, an apparatus for providing quantized congestion notification (QCN) proxy functionality to a network device control plane includes a processor and logic integrated with and/or executable by the processor, the logic being configured to enable QCN proxy functionality for a particular congestion notification priority value (CNPV) on each edge port of a QCN edge switch, wherein the QCN edge switch includes one or more edge ports connected to devices outside of a congestion notification domain (CND) that operates on the particular CNPV, and forward congestion notification packets received at the QCN edge switch using the QCN proxy functionality when the packets are destined for one of the devices connected outside of the CND that is not QCN-enabled. Other systems, methods, and computer program products for providing QCN proxy functionality to a network device control plane are described in more embodiments.

20 Claims, 7 Drawing Sheets

(58) Field of Classification Search
USPC .................................. 370/229, 225, 240
See application file for complete search history.

(56) References Cited

U.S. PATENT DOCUMENTS

| | | | | |
|---|---|---|---|---|
| 2002/0087723 | A1* | 7/2002 | Williams | H04L 12/5602 709/240 |
| 2011/0035498 | A1* | 2/2011 | Shah | H04L 12/12 709/226 |
| 2013/0205038 | A1 | 8/2013 | DeCusatis et al. | |
| 2013/0246650 | A1 | 9/2013 | Tsuboki et al. | |
| 2013/0297787 | A1 | 11/2013 | Shah et al. | |
| 2013/0315054 | A1* | 11/2013 | Shamis | H04L 47/58 370/225 |
| 2013/0322252 | A1 | 12/2013 | DeCusatis et al. | |
| 2014/0119193 | A1* | 5/2014 | Anand | H04L 47/125 370/237 |
| 2014/0371941 | A1* | 12/2014 | Keller | H02J 13/0006 700/297 |

OTHER PUBLICATIONS

Lin et al., "A Study of Network Infrastructure Optimization for Data Center Servers," 15th International Symposium on in Wireless Personal Multimedia Communications (WPMC), 2012 IEEE, pp. 164-168.
Zhang et al., "Shrinking MTU to Mitigate TCP Incast Throughput Collapse in Data Center Networks," 2011 Third International Conference on Communications and Mobile Computing, 2011 IEEE, pp. 126-129.
Pan et al., "QCN: Quantized Congestion Notification," IEEE802, 2007, pp. 1-26.

\* cited by examiner

QUANTIZED CONGESTION NOTIFICATION (QCN) PROXY FUNCTION IN DATA CENTER BRIDGING CAPABILITIES EXCHANGE (DCBX) PROTOCOL

BACKGROUND

The present invention relates to congestion notification in a network, and more specifically, this invention relates to quantized congestion notification (QCN) proxy functionality provided in a network which utilizes data center bridging capabilities exchange (DCBX) protocol.

The QCN proxy functionality is a very useful feature which allows interoperability of QCN and non-QCN capable devices in the same congested notification domain, thus allowing congestion control to be pushed toward the edges of the congested notification domain in order to avoid head-of-line (HOL) blocking up the line.

Currently there are very few end point devices (congested network adapters) with QCN support available; however, there are many end point devices which support priority flow control (PFC). The problem when trying to use the QCN proxy feature is that every congested port of the switch needs to be manually configured to enable this feature. In order for a port to work correctly with the QCN proxy feature, its defense mode choice must be set to interior so that: 1) the incoming traffic does not get remapped to a non-congestion notification value which is not monitored (e.g., a non-CNPV value), and 2) the outgoing traffic must have its congestion notification tag (CN-TAG) removed (because the CN-TAG is unrecognizable by the parsing stages since it does not support QCN).

Currently, when a system administrator chooses to use the automatic (auto) mode of operation for the QCN protocol, and wants to interconnect devices which do not support QCN (by using the proxy function) together with devices that support QCN, those device will have the defense mode set to edge, according to the Institute of Electrical and Electronics Engineers (IEEE) 802.1qau standard. However, when a congested port has the defense mode set to edge, the incoming traffic will be steered away from QCN capable queues (the priority gets remapped), plus the CN-TAG from the outgoing traffic is removed. By remapping the incoming traffic to other queues, no congestion notification messages (CNMs) are sent back to the source (since the traffic is not treated as a congestion flow anymore), which renders the proxy functionality useless.

BRIEF SUMMARY

In one embodiment, an apparatus for providing quantized congestion notification (QCN) proxy functionality to a network device control plane includes a processor and logic integrated with and/or executable by the processor, the logic being configured to enable QCN proxy functionality for a particular congestion notification priority value (CNPV) on each edge port of a QCN edge switch, wherein the QCN edge switch includes one or more edge ports connected to devices outside of a congestion notification domain (CND) that operates on the particular CNPV, and forward congestion notification packets received at the QCN edge switch using the QCN proxy functionality when the packets are destined for one of the devices connected outside of the CND that is not QCN-enabled.

In another embodiment, a method for providing QCN proxy functionality to a network device control plane includes enabling QCN proxy functionality for a particular CNPV on each edge port of a QCN edge switch, wherein the QCN edge switch includes one or more edge ports connected to devices outside of a CND that operates on the particular CNPV, and forwarding congestion notification packets received at the QCN edge switch using the QCN proxy functionality when the packets are destined for one of the devices connected outside of the CND that is not QCN-enabled.

In another embodiment, a computer program product for providing QCN proxy functionality to a network device control plane includes a computer readable storage medium having program code embodied therewith, the program code being readable and/or executable by at least one processor to cause the at least one processor to enable, by the at least one processor, QCN proxy functionality for a particular CNPV on each edge port of a QCN edge switch, wherein the QCN edge switch includes one or more edge ports connected to devices outside of a CND that operates on the particular CNPV, and forward, by the at least one processor, packets received at the QCN edge switch using the QCN proxy functionality when the packets are destined for one of the devices connected outside of the CND that is not QCN-enabled.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods, and computer program products for providing the quantized congestion notification protocol in a network which has one or more end points that are not capable of handling congestion notification messages.

In one general embodiment, an apparatus for providing quantized congestion notification (QCN) proxy functionality to a network device control plane includes a processor and logic integrated with and/or executable by the processor, the logic being configured to enable QCN proxy functionality for a particular congestion notification priority value (CNPV) on each edge port of a QCN edge switch, wherein the QCN edge switch includes one or more edge ports connected to devices outside of a congestion notification domain (CND) that operates on the particular CNPV, and forward congestion notification packets received at the QCN edge switch using the QCN proxy functionality when the packets are destined for one of the devices connected outside of the CND that is not QCN-enabled.

In another general embodiment, a method for providing QCN proxy functionality to a network device control plane includes enabling QCN proxy functionality for a particular CNPV on each edge port of a QCN edge switch, wherein the QCN edge switch includes one or more edge ports connected to devices outside of a CND that operates on the particular CNPV, and forwarding congestion notification packets received at the QCN edge switch using the QCN proxy functionality when the packets are destined for one of the devices connected outside of the CND that is not QCN-enabled.

In another general embodiment, a computer program product for providing QCN proxy functionality to a network device control plane includes a computer readable storage medium having program code embodied therewith, the program code being readable and/or executable by at least one processor to cause the at least one processor to enable, by the at least one processor, QCN proxy functionality for a particular CNPV on each edge port of a QCN edge switch, wherein the QCN edge switch includes one or more edge ports connected to devices outside of a CND that operates on the particular CNPV, and forward, by the at least one processor, packets received at the QCN edge switch using the QCN proxy functionality when the packets are destined for one of the devices connected outside of the CND that is not QCN-enabled.

Figure 1:
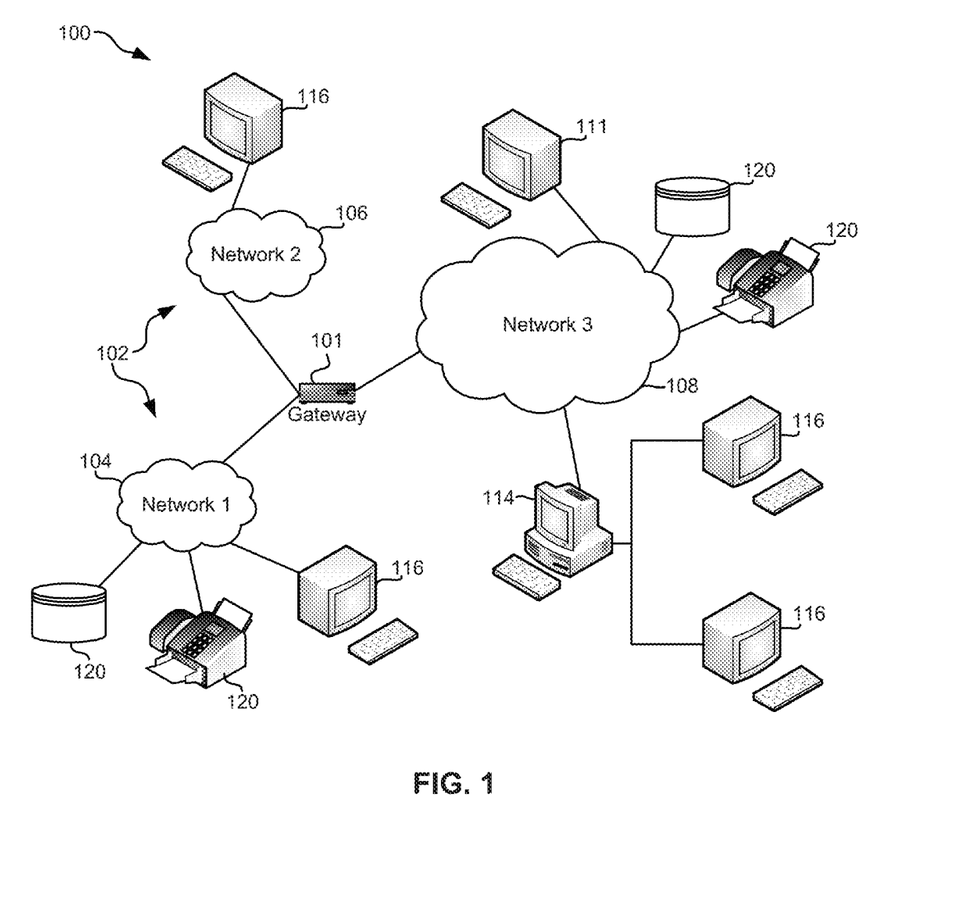
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
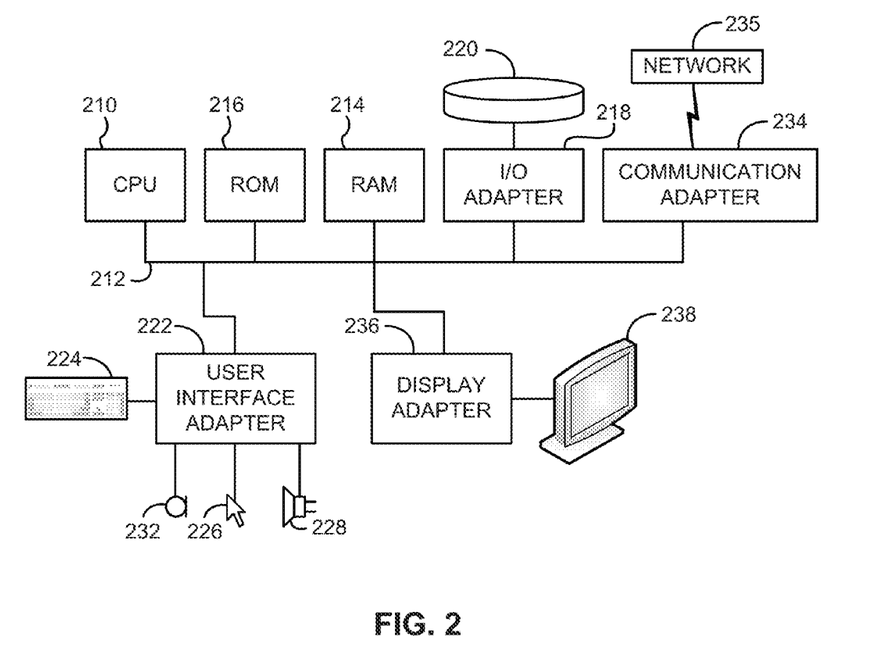
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

There are no known systems capable of providing QCN functionality across non-QCN devices. Therefore, in order to implement such a system, one embodiment may include manually configuring every congested port of the switch with a defense mode that is proper for its position in the network. In order to perform this configuration, the administrator needs to have a clear overview of the whole network topology. Also, when the network topology changes, the administrator will be forced to reconfigure for the affected ports.

Figure 3:
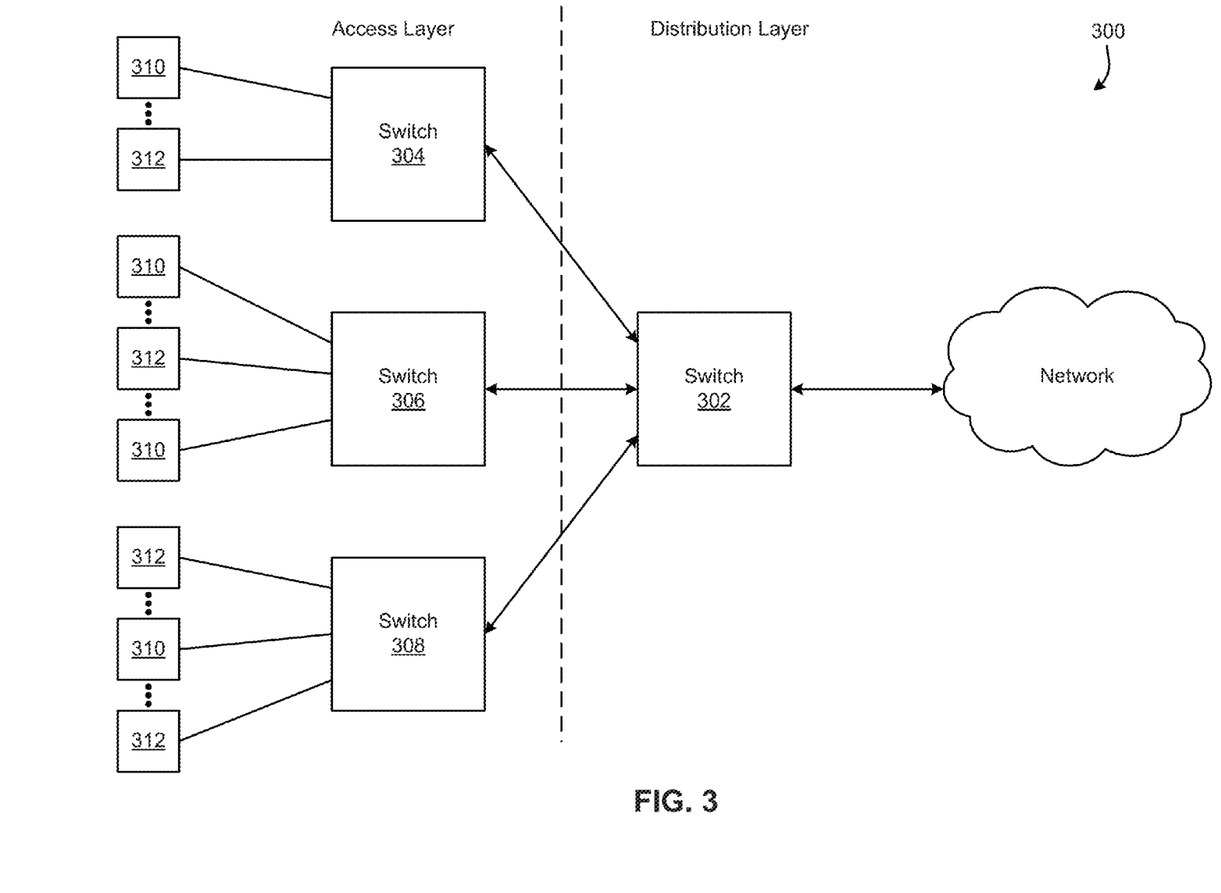
FIG. 3 is a diagram of a simplified network, according to one embodiment.

In one example, as shown in FIG. 3, a simple network 300 may include four interconnected switches, switch 304, switch 306, and switch 308 being considered as part of an access layer, and switch 302 being considered part of a distribution layer. To each switch, a variable number of end points are connected (any number of end points per switch are possible based on the number of ports for each switch), some of these end points 310 supporting the QCN protocol, other connected end points 312 without QCN support, but having the capability to support PFC. In another embodiment, some end points may have no flow control support at all.

When the administrator chooses to benefit from the QCN proxy functionality so that proper congestion management may be performed on the network 300, and so that congestion control is pushed toward the edges of the L2 domain, and in order to avoid head-of-line (HOL) blocking, there are two options available after enabling the QCN-proxy functionality for the desired priority.

In the first option, the administrator may use the automatic (auto) mode of operation in which all switch ports have the defense mode for each port set to "edge" (basically the input will get remapped to a different '.1p' priority than the planned priority to be used for the specific type of traffic of the used service). When the defense mode is set to "edge," the QCN proxy will not work at all, because no congestion notification messages (CNMs) will arrive at respective connected ports of switch 304, switch 306, and switch 308, which is a significant drawback to implementing QCN in this manner.

In the second option, the administrator may use the administrative (admin) mode of operation in which all ports on all three switches 304, 306, 308 will be iterated through and set to the desired defense mode. Also, when a topology change occurs (such as a user changing some cables from network outlets) the congestion control will no longer function as expected, and traffic drops will occur due to CN-TAG'd frames arriving at non-QCN capable devices, which is also a significant drawback to implementing QCN in this manner.

An option where end points without QCN and PFC capabilities are connected is not even considered, because this adds an additional degree of complexity to the existing problem.

Therefore, in order to implement QCN in a network in which all end points are not QCN-compatible, but which are all PFC capable, an extra layer for the management plane of the quantized congestion notification protocol is added in the presence of the QCN proxy feature (the QCN proxy feature allows the conversion of CNM frames to PFC pause frames so that congestion control is possible even when an end point does not handle reaction points) according to one embodiment. Furthermore, the extra layer updates the congestion notification domain state machine based on this management option and on the data center bridging capabilities exchange (DCBX) protocol capability of PFC.

In this way, the auto mode of operation of the QCN feature may be combined with the QCN proxy feature. Some of the advantages of this implementation over the other options described above include the following.

First, the administrator is not required to have knowledge of the exact network topology and capabilities of each of the ports. Second, the gradual integration of QCN and non-QCN capable devices into existing networks is possible. Third, the defense mode is updated dynamically, without any administrator intervention when topology changes occur. Fourth, the effective spread of congestion control toward the edges of the L2 domain is allowed to occur.

With the additional configuration layer added to the Institute of Electrical and Electronics Engineers (IEEE) 802.1Qau standard, when a switch supports the QCN proxy feature, it will automatically configure the port defense modes properly, so that congested ports being at the edge of the congestion domain will be integrated into the domain. Therefore, the transmit rate of the switch ports may be controlled using the PFC frames.

In one embodiment, a new congestion notification variable per congestion notification priority value (CNPV) may be defined, such as in chapter 32.3 Congestion notification per-CNPV variables, from the IEEE 802.1Qau standard. This variable may be referred to as "cncpProxyEnable," and it may be a Boolean variable indicating whether the QCN proxy function for all ports for this CNPV in this component is enabled or not. This may be overridden by the cnpdProxyEnable variable.

Also, some additional per-port-per-CNPV variables may be defined, such as in chapter 32.4 Congestion Notification Domain (CND) defense per-Port per-CNPV variables, from the IEEE 802.1Qau standard. These additional variables may include "cnpdProxyEnable" which may be a Boolean variable specifying whether the QCN proxy function has been enabled or not for this port for this priority (a managed variable), "cnpdPFCEnabled" which may be a Boolean variable indicating whether PFC functionality is enabled for this port (a variable that is not manageable and is only set by the state machine), and "cnpdDoesProxy" which may be a per-port-per-priority Boolean variable derived from the managed objects which determines whether the QCN proxy functionality is activated for a particular {port,priority} tuple.

In one embodiment, the cnpdDoesProxy variable may be computed as shown in Table 1, below, based on the managed objects.

TABLE 1

| (Per-port-per-priority) cnpdDefModeChoice 32.4.1 | (Component-per-priority) cncpDefModeChoice 32.3.1 | cnpdPFCEnabled | cnpdDoesProxy value |
|---|---|---|---|
| cpcAdmin | any | TRUE | cnpdProxyEnable |
| cpcAdmin | any | FALSE | FALSE |
| cpcAuto | any | TRUE | cnpdProxyEnable |
| cpcAuto | any | FALSE | FALSE |

TABLE 1-continued

| (Per-port-per-priority) cnpdDefModeChoice 32.4.1 | (Component-per-priority) cncpDefModeChoice 32.3.1 | cnpdPFCEnabled | cnpdDoesProxy value |
|---|---|---|---|
| cpcComp | cpcAdmin | TRUE | cncpProxyEnable |
| cpcComp | cpcAdmin | FALSE | FALSE |
| cpcComp | cpcAuto | TRUE | cncpProxyEnable |
| cpcComp | cpcAuto | FALSE | FALSE |

Two additional congestion notification domain defense procedures may also be created, such as in chapter 32.5 Congestion Notification Domain (CND) procedures, from the IEEE 802.1Qau standard.

The additional congestion notification domain defense procedures may utilize two additional functions: TurnOnCnProxy( ), which activates the QCN proxy functionality on a per-port-per-priority basis, and TurnOffCnProxy( ), which deactivates the QCN proxy functionality on a per-port-per-priority basis.

Figure 4:
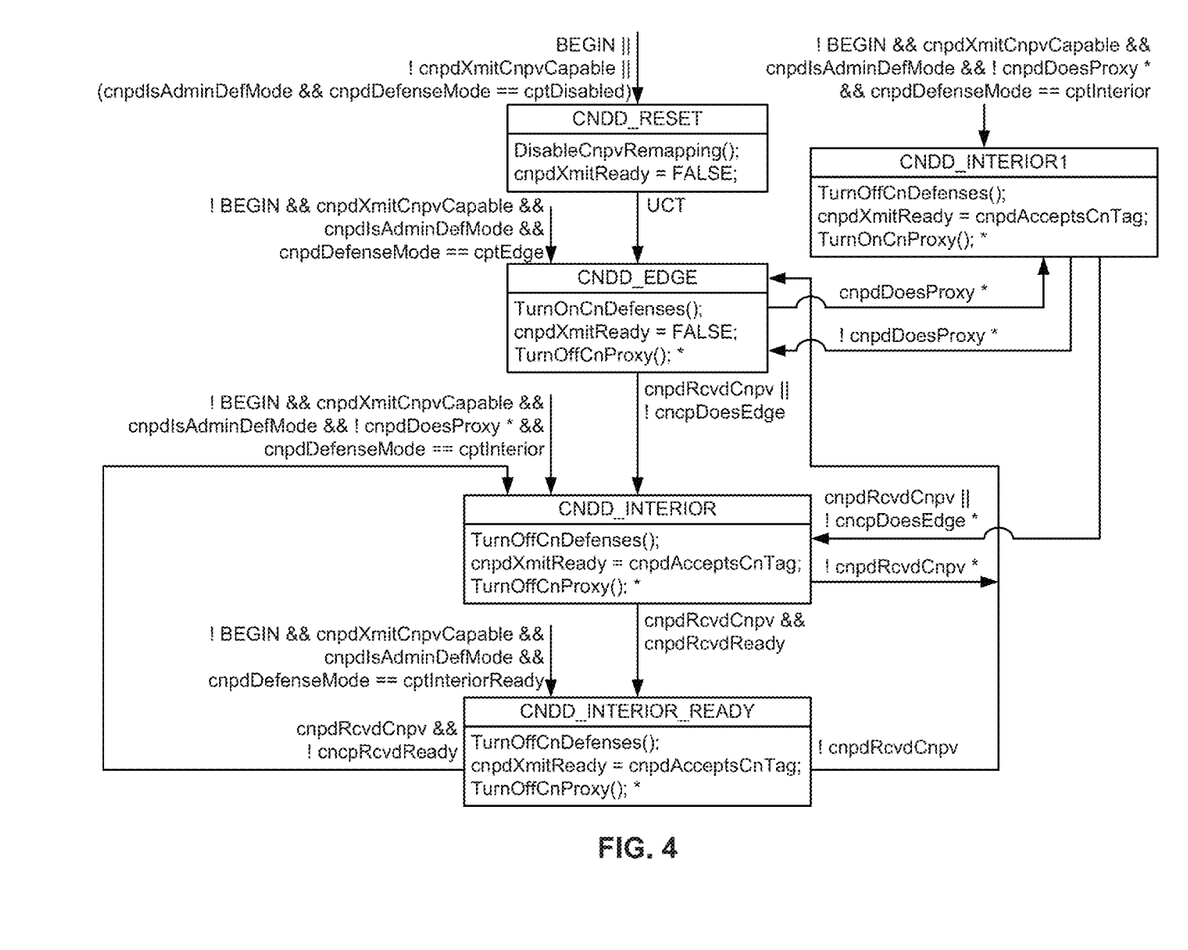
FIG. 4 shows a defense mode state machine, according to one embodiment.

The defense mode state machine, as described in chapter 32.6 Congestion Notification Domain defense state machine from the 802.1Qau standard, may also be updated. The addition to the state machine is indicated in FIG. 4, as the CNDD_INTERIOR1 block and each procedure and/or variable indicated by an asterisk (*).

A state machine is used by the IEEE 802.1 Qau standard in order to determine the defense state of a certain port for a certain priority, based on administrative settings and/or the exchange of capabilities between partner nodes. For example, when a configuration is being automatically set, the state machine for a certain {port, priority} will transit to the edge state. The switch is capable of supporting the QCN proxy feature, so the administrator has set cncpProxyEnable to TRUE. Also, the partner ports exchange capabilities between one another. When one partner port is supporting PFC, but not QCN, according to Table 1, the settings would appear as shown in row 8, reproduced below for reference.

| cpcComp | cpcAuto | TRUE | cncpProxyEnable |
|---|---|---|---|

As shown, cnpdDoesProxy will have the value of cncpProxyEnable for that particular {port,priority}. This means that in the state machine, a transition will be made from CNDD_EDGE to CNDD_INTERIOR1 (refer to FIG. 4 to see the exact transition). Now, for this {port,priority} the following actions will be performed:
  TurnOffCnDefenses( ): no remapping of traffic on different priorities;
  cnpdAcceptsCnTag: will accept CN-TAGs from partners;
  TurnOnCnProxy( ): activates the QCN proxy functionality on a per-port-per-priority basis If for some reason, PFC is disabled for its partner, the state machine will transition back to the CNDD_EDGE state, because cnpdDoesProxy will become FALSE, which is shown in row 9 of Table 1, reproduced below for reference.

| cpcComp | cpcAuto | FALSE | FALSE |
|---|---|---|---|

When the partner supports QCN, the state machine will transition either from CNDD_INTERIOR1 to CNDD_INTERIOR or from CNDD_EDGE to CNDD_INTERIOR (as shown in FIG. 4).

In one embodiment, when the defense mode of a switch is configured to be auto detected, such as by using the link layer discovery protocol (LLDP), and when the QCN Proxy feature has been enabled, the defense mode will automatically switch to the interior defense state (CNDD_INTERIOR1), for proper operation of the QCN proxy functionality.

When that port is disconnected and a QCN-capable end point is connected, the defense state will transition automatically to the appropriate interior-ready state (CNDD_INTERIOR_READY), without any administrator intervention.

Figure 5:
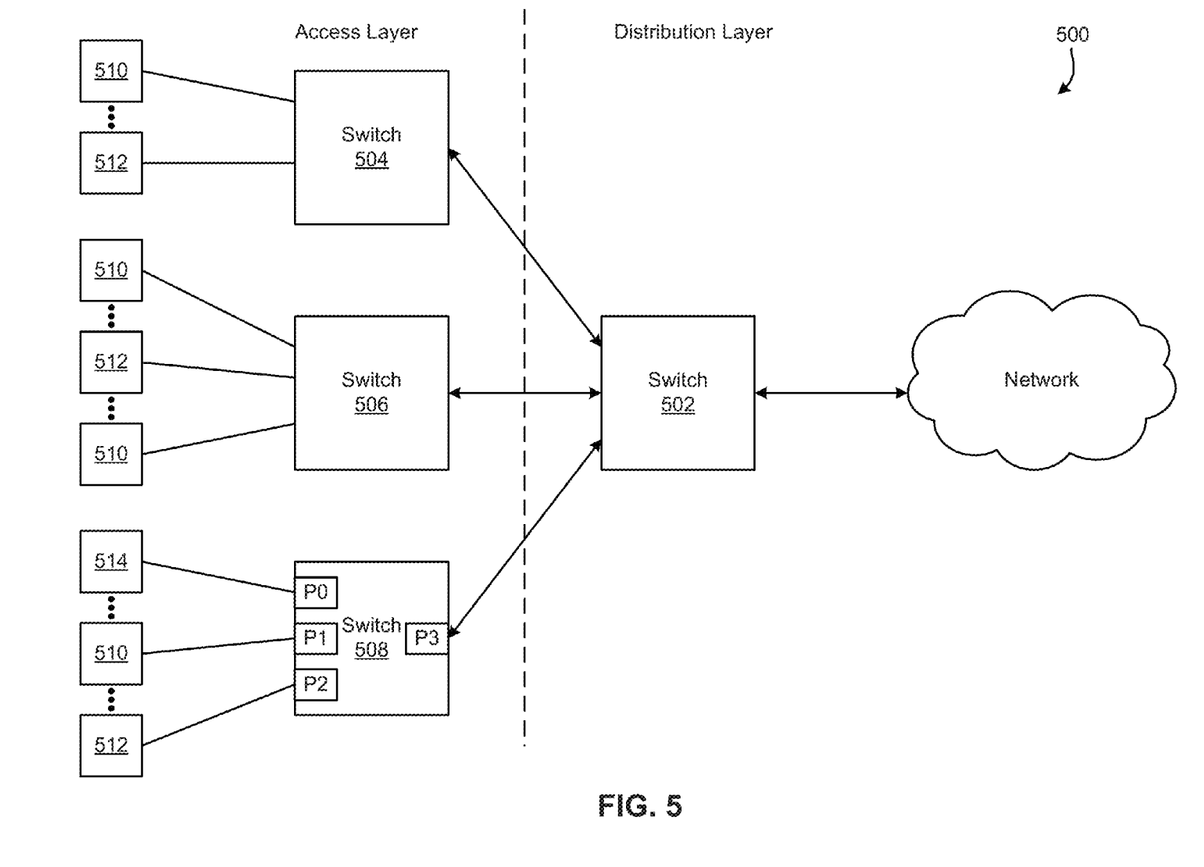
FIG. 5 is a diagram of a network, according to one embodiment

In another exemplary embodiment, refer to FIG. 5, which shows a network 500 comprising four interconnected switches, switch 504, switch 506, and switch 508 being considered as part of an access layer, and switch 502 being considered part of a distribution layer. To each switch, a variable number of end points are connected (any number of end points per switch are possible based on the number of ports for each switch), some of these end points 510 supporting the QCN protocol (and PFC), other connected end points 512 without QCN support, but having the capability to support PFC.

The administrator may configure all three QCN proxy-capable switches 504, 506, 508 using the auto mode of operation (and activating the QCN proxy functionality for a specific traffic priority). Afterwards, each port on each of these QCN proxy-capable switches 504, 506, 508 will transition to a desired defense mode for that specific priority. Ports connected to QCN-capable end point devices 510 have the defense mode set to interior-ready (CNDD_INTERIOR READY) and the ports connected to non-QCN-capable end point devices 512, but which support PFC, have the defense mode set to interior (CNDD_INTERIOR1). In this way, proper congestion control at the edges of the L2 domain may be performed as desired by the administrator or some flow controller of a type known in the art.

In case a topology change occurs (such as a cable from a QCN-capable end point device 510 being switched with a cable from a non-QCN-capable end point device 512), the defense mode choice automatically transitions to the appropriate state, such as to interior (when the partner supports PFC) or to edge (when the partner does not support PFC).

Additionally, when an end point 514 without PFC support is connected to the network 500, this non-PFC end point 514 is detected by the DCBX protocol executing in the network 500, and the defense mode is automatically transitioned to edge, isolating any port connected to the non-PFC end point 514 from the congestion control scheme. In FIG. 5, port P0 on switch 508 is connected to the non-PFC end point 514 and therefore port P0 will have its defense mode automatically transitioned to edge.

For example, when the CNPV is a predetermined value, such as 4 (e.g., CNPV=4) or some other agreed upon value, and QCN and PFC are enabled on ports P1 and P3 with port P2 only being PFC-enabled, the switch 508 converts QCN CNMs for flows on P2 to PFC pause frames and switches to link level flow control instead of utilizing QCN-based flow control. The switch 508 does not remap flows with a CNPV of 4 from port P2 to a non-CNPV value based on admin flags configuration in one embodiment.

Figure 6:
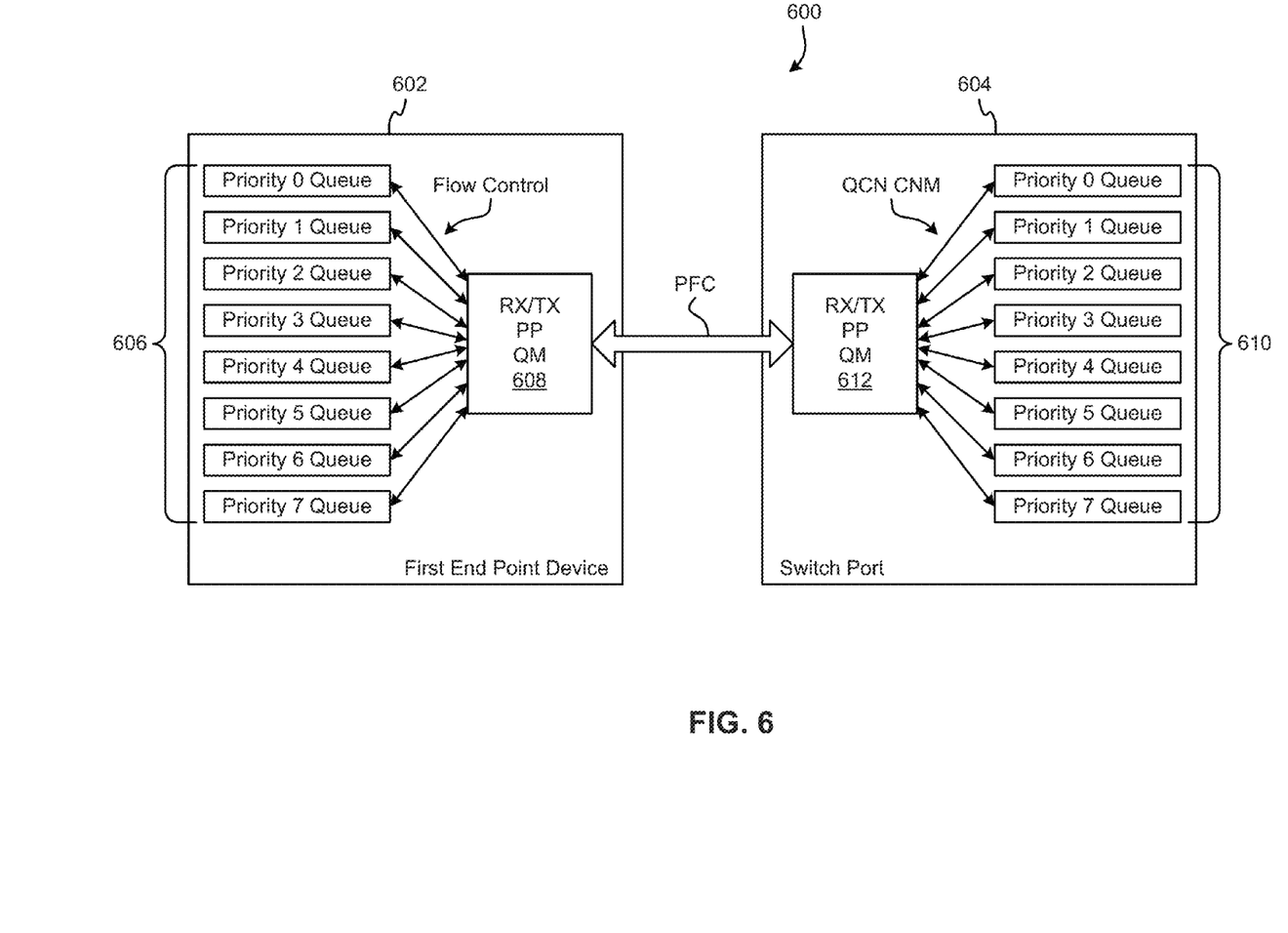
FIG. 6 shows conversion logic, according to one embodiment.

Now referring to FIG. 6, conversion logic 600 for transitioning from QCN to PFC, and vice versa, is shown according to one embodiment. As shown, a first end point device 602, such as a network interface card (NIC) in a server which is PFC-capable, has a plurality of queues 606, one for each priority level, along with logic 608 configured to send and receive packets and messages. A switch port 604 is connected to the first end point device 602, and also includes a plurality of queues 610, one for each priority level, along with logic 612 configured to send and receive packets and messages.

In this way, any CNM destined for the end point device 602 may be converted to a PFC notification prior to being transmitted from a priority transmission queue 610 on the switch port 604 to the corresponding priority queue on the end point device 602. In this way, the end point device 604 is capable of being included in flow control even though it is not QCN-capable. For this conversion to happen, cnpdProxyEnable=True, cnpdPFCEnabled=True, and cnpdDoesProxy=True.

Figure 7:
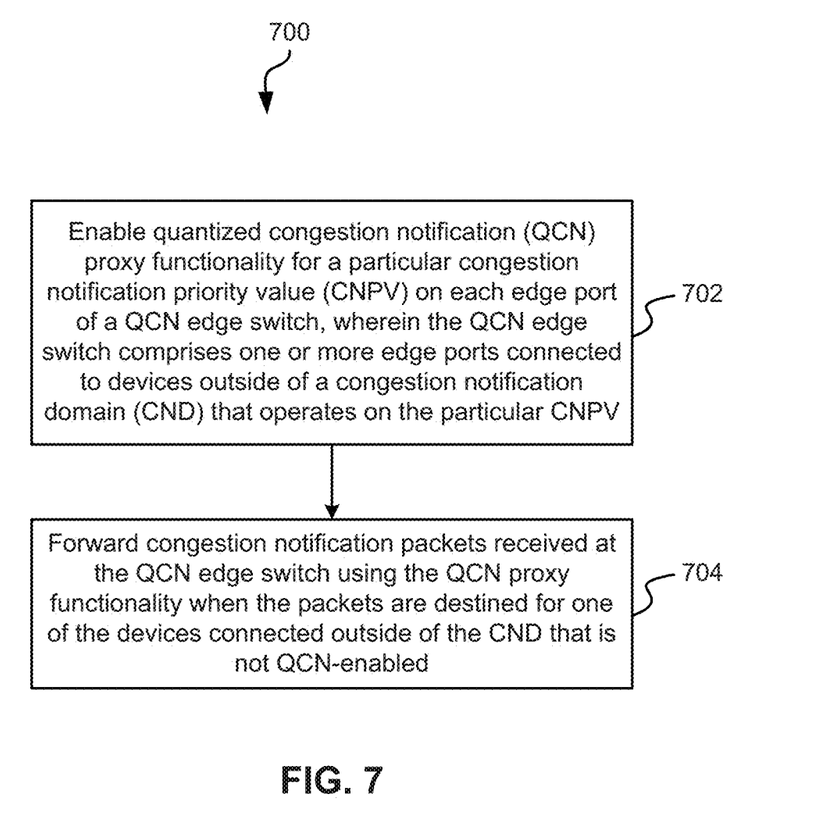
FIG. 7 shows a flowchart of a method according to one embodiment.

Now referring to FIG. 7, a flowchart of a method 700 for providing QCN proxy functionality to a network device control plane is shown according to one embodiment. The method 700 may be performed in accordance with the present invention in any of the environments depicted in FIGS. 1-6, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by a SDN-capable switching device, an OpenFlow switch, a DOVE switch, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 may initiate with operation 702, where QCN proxy functionality for a particular CNPV is enabled on each edge port of a QCN edge switch.

The QCN edge switch comprises one or more edge ports connected to devices outside of a particular CND that operates on the particular CNPV, e.g., QCN proxy functionality is enabled for all edge ports of the QCN edge switch for the CNPV designated for the particular CND in which the QCN edge switch is located (and positioned at an edge of).

In operation 704, congestion notification packets received at the QCN edge switch are forwarded using the QCN proxy functionality when the packets are destined for one of the devices connected outside of the CND that is not QCN-enabled. The QCN proxy function is used only to convert QCN congestion notification messages (CNMs) into PFC pause frames to be used for congestion control.

In one embodiment, method 700 may further include exchanging congestion capabilities of the QCN edge switch with each device connected to the QCN edge switch using the DCBX protocol. An extension to the DCBX may be utilized to allow for such an exchange of capabilities, as described herein in more detail and in additional embodiments.

In this embodiment, the congestion capabilities may be exchanged by sending a first message indicating congestion capabilities of the QCN edge switch from all edge ports thereof to each peer device connected to one of the edge ports. The congestion capabilities of the QCN edge switch include at least one of (and preferably all of): PFC, QCN, and QCN proxy functionality. QCN proxy functionality allows the QCN edge switch to translate QCN to PFC and vice versa for communication of congestion information across the CND boundary, whether to another CND or outside of any QCN-enabled domain.

In another embodiment, method 700 may further include receiving a second message back from each of the peer devices indicating congestion capabilities of each of the peer devices. In this second message, the congestion capabilities of each of the peer devices will also include at least one of: PFC, QCN, and enhanced transmission selection (ETS). The QCN edge switch will determine how to relay congestion information depending on what congestion capabilities the peer device has, e.g., if the peer device is PFC-enabled but not QCN-enabled, congestion information will be relayed to the peer device via PFC.

In a further embodiment, method 700 may also include utilizing IEEE 802.3x standards for relaying congestion information to a first peer device when the first peer device does not respond to the first message with the first peer device's congestion capabilities, thereby indicating that the first peer device is not capable of utilizing PFC or QCN.

In one embodiment, method 700 may further include mapping the particular CNPV of the CND to a predetermined PFC priority value to create a QCN-to-PFC mapping, and after creation of the QCN-to-PFC mapping, it may be used when forwarding CNMs to devices which are not QCN-enabled, as described in more detail herein in additional embodiments. In a further approach, the predetermined PFC priority value may be set to be equal to the CNPV, or to some other value (0-7) which is predetermined and understood by the devices in the CND and PFC-enabled devices outside of the CND.

In another embodiment, method 700 may further include executing a defense mode state machine on the QCN edge switch, the defense mode state machine being configured to automatically recognize a congestion capability for a peer device upon receiving a packet from the peer device indicating the congestion capability for the peer device, and set an appropriate defense mode for one or more ports (edge ports have the defense mode state to edge) of the QCN edge switch that are coupled to the peer device. This functionality may be implemented according to any of the embodiments described herein in more detail.

In one particular embodiment, the defense mode state machine may comprise two interior modes, a first interior mode where congestion notification proxy functionality is provided, and a second interior mode where congestion notification proxy functionality is not provided.

Furthermore, management information base (MIB) parameters for translation of QCN to PFC may comprise one or more of the following parameters: a cncpProxyEnable parameter indicating whether QCN proxy functionality is enabled for all ports of the QCN edge switch for the particular CNPV, a cnpdProxyEnable parameter indicating whether QCN proxy functionality is enabled for each port of the QCN edge switch on a per-port basis for the particular CNPV, a cnpdDoesProxy parameter indicating whether QCN proxy functionality is activated for a particular {port, priority} tuple derived from managed objects.

These parameters may be utilized as described previously herein in various embodiments.

In one embodiment, the QCN proxy functionality may be enabled in response to traffic engineering functionality being enabled by a software defined network (SDN) controller or due to some other instruction or programming provided by the SDN controller, allowing that the QCN edge switch is also a member of a SDN and configured to communicate with the SDN controller.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an ASIC, a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a CPU, an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An apparatus for providing quantized congestion notification (QCN) proxy functionality to a network device control plane, the apparatus comprising a processor and logic integrated with and/or executable by the processor, the logic being configured to:
enable QCN proxy functionality for a particular congestion notification priority value (CNPV) on each edge port of a QCN edge switch, wherein the QCN edge switch comprises one or more edge ports connected to devices outside of a congestion notification domain (CND) that operates on the particular CNPV; and
forward congestion notification packets received at the QCN edge switch using the QCN proxy functionality when the packets are destined for one of the devices connected outside of the CND that is not QCN-enabled.

2. The apparatus as recited in claim 1, wherein the logic is further configured to exchange congestion capabilities of the QCN edge switch with each device connected to the QCN edge switch using data center bridging capabilities exchange (DCBX) protocol.

3. The apparatus as recited in claim 2, wherein the logic configured to exchange the congestion capabilities of the QCN edge switch with each device connected to the QCN edge switch is further configured to:
send a first message indicating congestion capabilities of the QCN edge switch from all edge ports thereof to each peer device connected to one of the edge ports, wherein the congestion capabilities of the QCN edge switch include: priority flow control (PFC), QCN, and QCN proxy functionality.

4. The apparatus as recited in claim 3, wherein the logic is further configured to:
receive a second message back from each of the peer devices indicating congestion capabilities of each of the peer devices, wherein the congestion capabilities of each of the peer devices include at least one of: PFC, QCN, and QCN proxy functionality; and
relay congestion information to a first peer device when the first peer device does not respond to the first message with the first peer device's congestion capabilities, thereby indicating that the first peer device is not capable of utilizing PFC or QCN.

5. The apparatus as recited in claim 1, wherein the logic is further configured to:
map the particular CNPV of the CND to a predetermined PFC priority value to create a QCN-to-PFC mapping.

6. The apparatus as recited in claim 5, wherein the predetermined PFC priority value is set to be equal to the CNPV.

7. The apparatus as recited in claim 1, wherein the QCN proxy functionality is enabled in response to traffic engineering functionality being enabled by a software defined network (SDN) controller.

8. The apparatus as recited in claim 1, wherein the logic is further configured to execute a defense mode state machine on the QCN edge switch, the defense mode state machine being configured to:
automatically recognize a congestion capability for a peer device upon receiving a packet from the peer device indicating the congestion capability for the peer device; and
set an appropriate defense mode for one or more ports of the QCN edge switch that are coupled to the peer device.

9. The apparatus as recited in claim 8, wherein the defense mode state machine comprises two interior modes, a first interior mode where congestion notification proxy functionality is provided, and a second interior mode where congestion notification proxy functionality is not provided, and
wherein management information base (MIB) parameters for translation of QCN to PFC comprise: a cncpProxyEnable parameter indicating whether QCN proxy functionality is enabled for all ports of the QCN edge switch for the particular CNPV, a cnpdProxyEnable parameter indicating whether QCN proxy functionality is enabled for each port of the QCN edge switch on a per-port basis for the particular CNPV, a non-manageable cnpdPFCEnabled parameter indicating whether PFC functionality is enabled for each port of the QCN edge switch on a per-port basis, a cnpdDoesProxy parameter indicating whether QCN proxy functionality should be activated for a particular {port,priority} tuple derived from managed objects, a non-manageable TurnOnCnProxy( ) function which is configured to activate QCN proxy functionality on a per-port per-priority basis on the QCN edge switch, and a non-manageable TurnOffCnProxy( ) function which is configured to deactivate QCN proxy functionality on a per-port per-priority basis on the QCN edge switch.

10. A method for providing quantized congestion notification (QCN) proxy functionality to a network device control plane, the method comprising:
   enabling QCN proxy functionality for a particular congestion notification priority value (CNPV) on each edge port of a QCN edge switch, wherein the QCN edge switch comprises one or more edge ports connected to devices outside of a congestion notification domain (CND) that operates on the particular CNPV; and
   forwarding congestion notification packets received at the QCN edge switch using the QCN proxy functionality when the packets are destined for one of the devices connected outside of the CND that is not QCN-enabled.

11. The method as recited in claim 10, further comprising exchanging congestion capabilities of the QCN edge switch with each device connected to the QCN edge switch using data center bridging capabilities exchange (DCBX) protocol.

12. The method as recited in claim 11, wherein the exchanging the congestion capabilities of the QCN edge switch with each device connected to the QCN edge switch comprises:
   sending a first message indicating congestion capabilities of the QCN edge switch from all edge ports thereof to each peer device connected to one of the edge ports, wherein the congestion capabilities of the QCN edge switch include: priority flow control (PFC), QCN, and QCN proxy functionality.

13. The method as recited in claim 12, further comprising receiving a second message back from each of the peer devices indicating congestion capabilities of each of the peer devices, wherein the congestion capabilities of each of the peer devices include at least one of: PFC, QCN, and QCN proxy functionality.

14. The method as recited in claim 12, further comprising relaying congestion information to a first peer device when the first peer device does not respond to the first message with the first peer device's congestion capabilities, thereby indicating that the first peer device is not capable of utilizing PFC or QCN.

15. The method as recited in claim 10, further comprising:
   mapping the particular CNPV of the CND to a predetermined PFC priority value to create a QCN-to-PFC mapping.

16. The method as recited in claim 15, wherein the predetermined PFC priority value is set to be equal to the CNPV.

17. The method as recited in claim 10, further comprising executing a defense mode state machine on the QCN edge switch, the defense mode state machine being configured to:
   automatically recognize a congestion capability for a peer device upon receiving a packet from the peer device indicating the congestion capability for the peer device; and
   set an appropriate defense mode for one or more ports of the QCN edge switch that are coupled to the peer device.

18. The method as recited in claim 17, wherein the defense mode state machine comprises two interior modes, a first interior mode where congestion notification proxy functionality is provided, and a second interior mode where congestion notification proxy functionality is not provided, and wherein management information base (MIB) parameters for translation of QCN to PFC comprise: a cncpProxyEnable parameter indicating whether QCN proxy functionality is enabled for all ports of the QCN edge switch for the particular CNPV, a cnpdProxyEnable parameter indicating whether QCN proxy functionality is enabled for each port of the QCN edge switch on a per-port basis for the particular CNPV, a non-manageable cnpdPFCEnabled parameter indicating whether PFC functionality is enabled for each port of the QCN edge switch on a per-port basis, a cnpdDoesProxy parameter indicating whether QCN proxy functionality should be activated for a particular {port,priority} tuple derived from managed objects, a non-manageable TurnOnCnProxy( ) function which is configured to activate QCN proxy functionality on a per-port per-priority basis on the QCN edge switch, and a non-manageable TurnOffCnProxy( ) function which is configured to deactivate QCN proxy functionality on a per-port per-priority basis on the QCN edge switch.

19. A computer program product for providing quantized congestion notification (QCN) proxy functionality to a network device control plane, the computer program product comprising a computer readable storage medium having program code embodied therewith, the program code being readable and/or executable by at least one processor to cause the at least one processor to:
   enable, by the at least one processor, QCN proxy functionality for a particular congestion notification priority value (CNPV) on each edge port of a QCN edge switch, wherein the QCN edge switch comprises one or more edge ports connected to devices outside of a congestion notification domain (CND) that operates on the particular CNPV; and
   forward, by the at least one processor, packets received at the QCN edge switch using the QCN proxy functionality when the packets are destined for one of the devices connected outside of the CND that is not QCN-enabled.

20. The computer program product as recited in claim 19, wherein the program code is further readable and/or executable by the at least one processor to:
   exchange congestion capabilities of the QCN edge switch with each device connected to the QCN edge switch, at least one of the devices connected to the QCN edge switch being incapable of utilizing PFC or QCN, using data center bridging capabilities exchange (DCBX) protocol by:
     sending a first message indicating congestion capabilities of the QCN edge switch from all edge ports thereof to each peer device connected to one of the edge ports, wherein the congestion capabilities of the QCN edge switch include: priority flow control (PFC), QCN, and QCN proxy functionality;
     receiving a second message back from each of the peer devices indicating congestion capabilities of each of the peer devices, wherein the congestion capabilities of each of the peer devices include at least one of: PFC, QCN, and QCN proxy functionality; and
     relaying congestion information to a first peer device when the first peer device does not respond to the first message with the first peer device's congestion capabilities, thereby indicating that the first peer device is not capable of utilizing PFC or QCN;
   map the particular CNPV of the CND to a predetermined PFC priority value to create a QCN-to-PFC mapping;
   utilize the QCN-to-PFC mapping when forwarding a congestion notification message (CNM) to a device outside of the CND which is not QCN-enabled, wherein the predetermined PFC priority value is set to be equal to the CNPV in the QCN-to-PFC mapping; and execute a defense mode state machine on the QCN edge switch, the defense mode state machine being configured to:
   automatically recognize a congestion capability for a peer device upon receiving a packet from the peer device indicating the congestion capability for the peer device; and
   set an appropriate defense mode for one or more ports of the QCN edge switch that are coupled to the peer device.

* * * * *